US005770017A

United States Patent [19]
Brown et al.

[11] Patent Number: 5,770,017
[45] Date of Patent: Jun. 23, 1998

[54] METHOD FOR ABLATIVE HEAT TRANSFER

[75] Inventors: Douglas B. Brown, Ottawa; John Black, Markham, both of Canada

[73] Assignee: Ireton International, Inc., Nova Scotia, Canada

[21] Appl. No.: 486,364

[22] Filed: Jun. 7, 1995

Related U.S. Application Data

[63] Continuation of Ser. No. 799,402, Nov. 27, 1991, which is a continuation-in-part of Ser. No. 621,585, Dec. 3, 1990, abandoned.

[51] Int. Cl.$^6$ .................................................. C10B 51/00
[52] U.S. Cl. .............................................. 201/25; 201/27
[58] Field of Search .............................. 401/25, 3, 4, 27, 401/36, 38, 14; 162/4, 14

[56] References Cited

U.S. PATENT DOCUMENTS

| 3,177,128 | 4/1965 | Vartanian | 201/29 |
| 3,298,928 | 1/1967 | Esterer | 201/31 |
| 4,235,676 | 11/1980 | Chambers | 201/25 |
| 4,260,473 | 4/1981 | Bauer | 201/25 |

FOREIGN PATENT DOCUMENTS 604864  10/1934  Germany.

OTHER PUBLICATIONS

James P. Diebold et al., Progress in the Entrained Flow, Fast Pyrolysis of Biomas, SERI/PR–622–1151, *Quarterly Report for U.S. Dept. of Energy*, (1981).

James P. Diebold et al., Ablative Pyrolysis of Biomass in the Entrained–Flow Cyclonic Reactor at SERI,;SERI/PR–234–1883, Annual Report (1983).

W. Kaminsky et al., Recycling of Plastics, *Conservation and Recycling*; 1:91–110 (1976).

Donald S. Scott et al., Fast Pyrolysis of Waste Products; Biomass and Wastes XIV Conference Sponsored by IGT (1990).

R.G. Graham et al., Scale–up and Commericalization of Rapid Biomass Pyrolysis of Fuel and Chemical Production, Energy from Biomass and Wastes XIV 1C–T Conference (1990).

R.G. Graham et al., Thermal and Catalytic Fast Pyrolysis of Lignin by Rapid Thermal Processing (RTP), The National Reserach Council of Canada, Proceedings of the 7th Canadian Bioenergy Seminar (1989).

Reed, Research in Thermochemical Biomass Conversion, *Elsevier Applied Science* pp. 192–202 (1988).

Thomas B. Reed, *Contact Pyrolysis in a Pyrolysis Mill*, The Colorado School of Mines, Golden, CO, pp. 192–202.

*Primary Examiner*—Steven Alvo
*Attorney, Agent, or Firm*—Nutter, McClennen & Fish, LLP

[57] ABSTRACT

A method and apparatus for rapid heat transfer using surface-to-surface heat transfer of a solid or semi-solid feedstock against an inner surface of a containment vessel. The vessel is torus or helically shaped so that a feedstock (and products) can be conveyed through the vessel at a velocity which sustains the feedstock against the outer periphery of the internal surface of the vessel as it transits the vessel. The reaction vessel can be used for pyrolysis of materials such as waste rubber, municipal solid waste, plastics or papers so as to recover valuable petrochemical-based liquid reaction products as well as solid reaction products. The reaction vessel may also be used for gasification and combustion reactions.

9 Claims, 3 Drawing Sheets

METHOD FOR ABLATIVE HEAT TRANSFER

CROSS-REFERENCE TO RELATED APPLICATION

This is a continuation of application Ser. No. 07/799,402 filed on Nov. 27, 1991, which is a continuation-in-part of Ser. No. 07/621,585, filed Dec. 3, 1990 now abandoned.

BACKGROUND OF THE INVENTION

This invention relates to methods and apparatuses for the thermal regeneration of organic materials by pyrolysis while recovering valuable by-products of the reactions.

Plastic and rubber goods, including rubber tires, make up a significant portion of waste materials which are deposited in dumps and landfills. These products do not degrade rapidly and occupy landfill space which is becoming increasingly scarce.

Moreover, such discarded plastic and rubber wastes contain petrochemicals and other raw materials of potential value. It would be desirable to provide equipment and methods of recovering valuable petrochemical and other useful constituents of such wastes.

One technique for doing so utilizes rapid or flash reactions. These reactions require a highly efficient means of creating heat transfer from heated surfaces to feedstock surfaces. This can be accomplished with closely spaced, heated rollers. In these methods, the feedstock is delivered to the nip area of two parallel heated rollers where the heat transfer occurs. Although essential, a uniform supply of feedstock is not always delivered to the nip area. There is thus a need for improved devices and methods to effect rapid heat transfer to enable the efficient disposal of petrochemical-based wastes while recovering valuable resources through the disposal technique.

It is an object of the invention to provide a method and apparatus which effects rapid and efficient heat transfer from a heated surface to feedstock within a reactor vessel. Another object is to provide a system for pyrolyzing petrochemical-based waste products and petrochemical-contaminated soils to recover therefrom petrochemicals and other raw materials. It is a further object of the invention to provide an apparatus and method for efficiently and economically effecting the thermal regeneration of rubber tires to recover petrochemicals and other raw materials therefrom. A further object is to improve the quality of solid fuels such as coal, lignite and peat by conversion to liquids or gases. Yet another object is to generate steam from combustion reactions. Other objects will be apparent upon reading the disclosure which follows.

SUMMARY OF THE INVENTION

The invention relates to methods and apparatuses for the thermal regeneration of petrochemical-based waste materials and petrochemically contaminated soils. Thermal regeneration is effected by a pyrolysis reaction and the subsequent recovery of valuable by-products of the reaction. The invention is applicable to the up-grading of solid fuels such as coal, oil shale, tar sands, lignite and fuel peat. In addition, plastic and rubber waste as well as agricultural and forest primary waste materials can be used as feedstock from which to recover valuable pyrolysis reaction products.

More specifically, this invention pertains to a method and apparatus for surface-to-surface, ablative heat transfer to a solid or semi-solid feedstock from a hot surface of a containment vessel. The method can be used for the production of liquids or gases by pyrolysis, combustion or vaporization. The Ablative Heat Transfer Reactor of this invention comprises a torus or helically shaped vessel through which a gas-borne feedstock can be conveyed at a velocity such that the feedstock contacts the outer periphery of the internal surfaces of the vessel as it transits the vessel. The heat transfer to (or from) the feedstock takes place within the reactor vessel at the interface between the feedstock and the outer peripheral surfaces of the helically shaped reactor. The radius of the helix coils is selected so that the feedstock can be conveyed as gas-borne material through the reactor with sufficient centrifugal force to cause the feedstock to be forced against the outer periphery of the internal surfaces of the vessel and with sufficient gas velocity to continuously convey the products onward to exit the reactor. The conveying gas is pressurized to any selected level sufficient to convey the feedstock through the length of the reactor and any vessels that may be in series with the Ablative Transport Reactor.

The method and apparatus of this invention have a variety of applications. Shredded, used tires can be converted to gas and liquid products for post utilization or conversion. Oil shale can be processed for the recovery of the shale oil and the potentially valuable ash. Fuel oils can be produced from the organic fraction of municipal solid waste (known as refuse derived fuels, RDF). Conversion of waste plastics to fuel grade oils and gases is similar to the uses as described for used tires. Coal liquefaction and tar sands oil recovery can be performed by the method as well.

DETAILED DESCRIPTION OF THE INVENTION

Figure 1B:
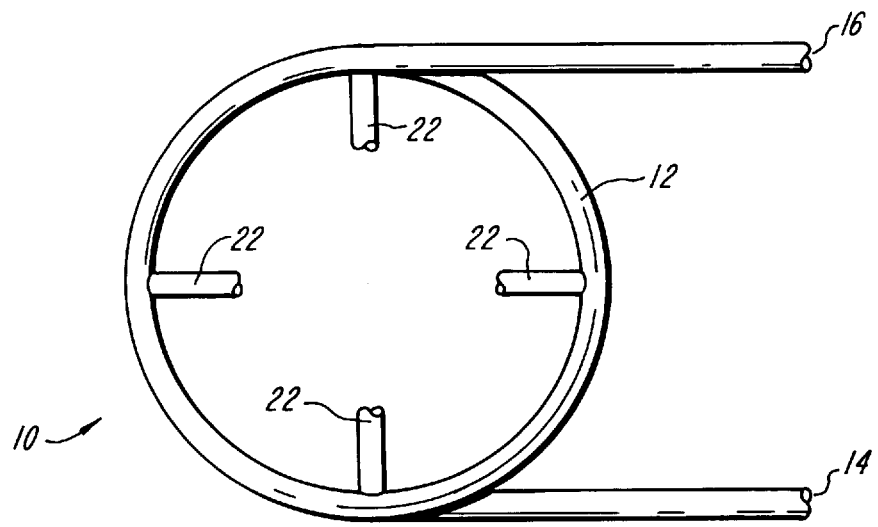
FIG. 1B shows a top view of an embodiment of the Ablative Transport Reactor.
Figure 1A:
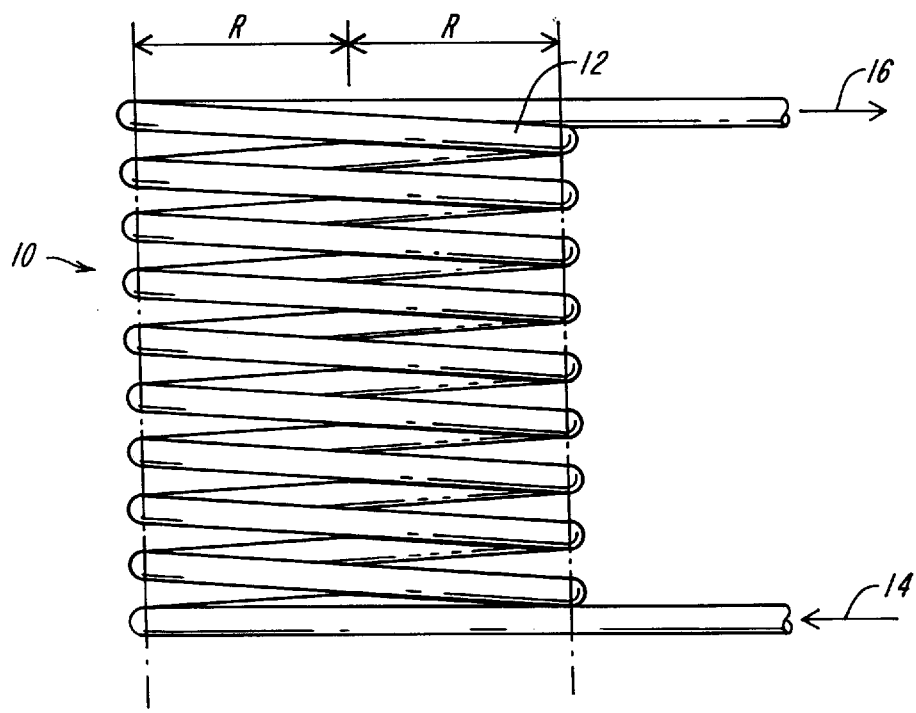
FIG. 1A shows a side, schematic view of an embodiment of the Ablative Transport Reactor.

FIGS. 1A and 1B illustrate one embodiment of a reactor vessel constructed according to the present invention. As illustrated, reactor vessel 10 preferably comprises a spiral or helically-shaped, hollow tubular vessel. This vessel takes the form of a plurality of helical coils 12. The reactor vessel 10 includes an inlet port 14, for introducing feedstock to the vessel, and an outlet port 16, for removing reaction products from the vessel. As further illustrated in FIGS. 2 and 3, vessel 10 may be disposed within a housing 18 which includes a burner 20 or other source of heat. In one embodiment (not shown), the reactor vessel 10 may be disposed within a water filled containment vessel to produce steam, when the reactor is used in the combustion mode.

As shown in FIG. 1B, reactor vessel 10 may also include inner conduits 22 which enable gas or vapor reaction products to be extracted from the inner peripheral surfaces of the vessel. Such products can be extracted while heat transfer and product generation continues at the outer periphery of internal surfaces of the vessel. Further, gas, steam or vapors can be added through conduits 20 for conveyance, or for reaction with the feedstock. In this embodiment, pyrolysis and combustion in sequence can be accomplished by removal of vapor or gases in the pyrolysis stage and subsequent injection of oxygen for post-gasification (partial combustion) or complete combustion of the remainder of the feedstock.

The helical shape of reactor vessel 10 allows the development of sufficient centrifugal force to cause feedstock particles to travel through the reactor in contact with the outer periphery of internal surfaces of the helical coils 12 which form vessel. The cross-section of the vessel can be round, square, elliptical, parabolic, or of any other configuration that allows the conveyance of the solid feedstock to the outer portions of the curved surfaces within the vessel. An especially preferred vessel is a helically configured, cylindrically formed pipe or tube, bent into a substantially uniform radius in the shape of a coiled hollow spring.

The radius (R) of the helical coils which form the vessel is determined by effects of the transporting gas velocity, the mass of the feedstock and the sail area of the feedstock particles, as described below. In one embodiment the radius (R) is about 6 inches.

The vessel can be made of any suitable material which provides containment of a gas-borne feedstock and effective heat transfer for pyrolysis, combustion or evaporation of a feedstock conveyed along the vessel surface. The preferred vessel is made of a metal, such as iron or steel. Preferred metals include stainless steel, carbon steel, and titanium. Exemplary stainless steels include grade 316 stainless steel and 400-series stainless steels.

The reactor vessel 10 may be oriented either horizontally or vertically. When mounted vertically, as shown in FIGS. 1A and 1B, the position of the inlet port 14 and outlet port 16 may be reversed.

The solid or semi-solid feedstock can be conveyed through the reactor by a heated carrier gas. The gas can be oxygen, air or any other gas suitable to the process performed. However, where the reactor is to operate in the pyrolysis mode, air and oxygen are not desirable carrier gases, since, to maximize the reactor's efficiency in producing primary pyrolysis products, oxidation should not occur and the presence of air and oxygen in the system should be eliminated or minimized. Exemplary carrier gases useful in the pyrolysis mode include nitrogen and carbon dioxide.

The gas is propelled at a velocity such that the feedstock it carries has sufficient contact pressure with the outer periphery of the internal surfaces of the vessel to achieve heat transfer and to deliver the reaction products to the outlet of the vessel. The gas can also provide some or all of the heat for the reaction. The inlet end of the reactor is preferably sealed by a feeding device which allows for the continuous delivery of feedstock into the reactor, but which prevents escape of the conveying gas.

Additional heat can be supplied externally to the periphery of the vessel, providing a heat gradient sufficient to cause heat inflow to the heat transfer zone of the vessel. This external heat may be derived, for example, from oil or gas fired burners.

The internal surfaces of the vessel can contain catalysts to enhance the rate of reaction and the generation of products. Alternatively, catalysts can be added to the feedstock. Those having ordinary skill in the art will appreciate that a variety of catalysts can be used. Exemplary catalysts include zeolite catalysts, nickel-molybdenum catalysts, chromium oxide catalysts, and Raney nickel catalysts.

Heat transfer across the outer periphery of the internal surfaces of the vessel to the surface of the feedstock allows for the partially liquefied surface of the solid feedstock to act as a lubricant against which the feedstock solids may move, thus reducing the risk of excessive abrasion of the vessel surfaces. To reduce surface abrasion, the inlet section of the reactor can be straight for sufficient length to permit liquefaction of the feedstock surfaces before contact with the high heat transfer area of the reactor, thus assuring a lubricant for the solid materials while in contact with the high heat transfer area of the reactor.

A spiral or helically shaped vessel allows for the maximum heat transfer from a hot metallic surface (or any other high heat transfer surface) to a feedstock for the purposes of converting solids into gas, liquid, or vapors. The necessary balance of centrifugal and conveying gas forces is resolved by the design criteria of feedstock mass flow, the gas mass flow, the area of the cross section of the vessel, the removal rate of products and the addition rate of other solids, liquids and gases that may affect the types of products generated in the vessel. Vessels of one foot to two feet radii can be tested to determine the optimum configuration for a particular feedstock. The method allows for retention times in the vessel in the order of seconds (not hours as with other configurations) and assures first-in/first-out product control.

The transporting gas velocities useful in the method of this invention are consistent with known velocities used in air or gas transportation of solids and are sufficient to create a centrifugal force that holds the solid feedstock against the outer periphery of the internal surfaces of the vessel. The centrifugal force and the conveying gas velocity are calculated to assure the movement of the feedstock continuously along the length of the containment zone of the reactor. The velocity of the conveying gas will vary depending upon the coil radius. Generally, suitable velocities are those sufficient to develop 50 to 1000 G forces on the feedstock particles. Exemplary velocities may range from 2000 to 8000 feet per minute at about 500° C.

A range of feedstocks can be processed. These include waste rubber tires, waste plastics, waste papers, forest and agriculture wastes, oil shale and tar sands. Typically the feedstock material is reduced in size to a maximum of two inches in any two dimensions for ease of handling in the storage and delivery systems.

The retention time of feedstock in the ablative transport reactor can be in the range of about 50 to 6000 milliseconds, and more preferably in the range of 100 to 500 milliseconds. The vapor pressure can range from one to over one thousand pounds per square inch. The pressure constraints are limited by the ASME Pressure Vessel Code design standards which also limit the internal cross section of the tube or pipe. Operating temperatures will generally be in the range of 300 to 950 degrees Celsius. These temperature ranges may vary along with the retention times in the reactor to achieve an optimum range of product yields. The retention times are affected by the gas velocity and the length of the transport zone in the reactor. As mentioned, immobilized catalysts can be added in the reactor wall or free flowing catalysts can be added in the feedstocks to extend reactor usages.

Figure 2:
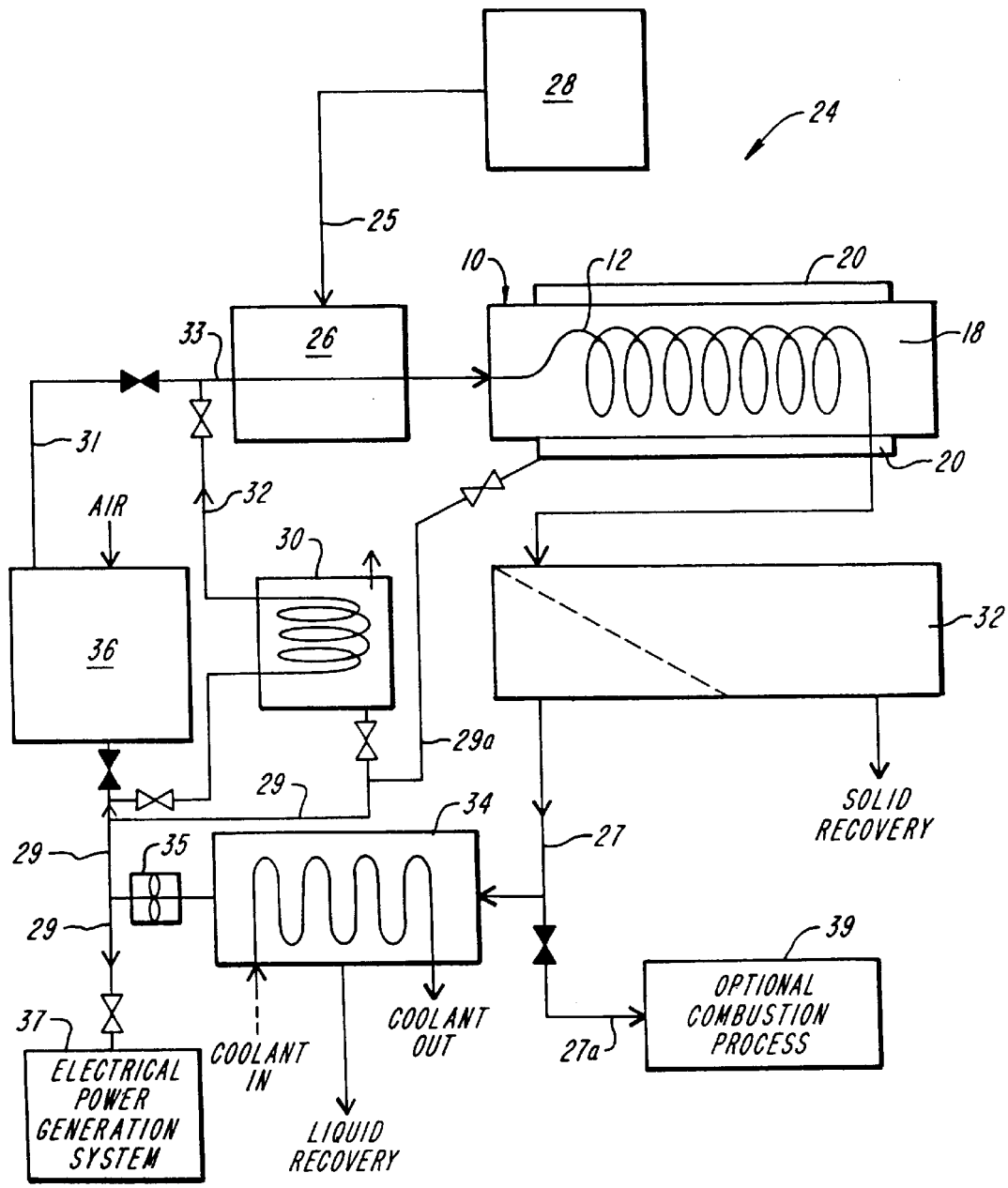
FIG. 2 shows one embodiment of a system using the reactor of the invention for pyrolyzing waste and for recovering useful pyrolysis reaction products.

FIG. 2 shows a system 24 for pyrolysis of a feedstock (not shown) using the ablative transport reactor 10 of this invention. The system 24 encompasses mixing means 26 for mixing the feedstock with a precompressed heating and conveying gas; feed means 28 for storing and conveying the feedstock into the mixer 26; means for heating recycled gas, such as a heat exchanger 30; the ablative transport reactor 10; filter means 32 for separating solids from gas recovered from the reactor; and condenser means 34 for condensing vapors recovered from the reactor 10; and compression means 35 for compressing the recovered gas. The system may also include a combustor means 36 for the combustion of gases. The gases exiting combustor 36 may be recycled for mixture with the carrier gas. An external heat source such as burner 20 can be used with reactor 10.

All components of the system (except the reactor 10) can be obtained from recognized international suppliers.

To illustrate the working of the system 24 illustrated in FIG. 2, the processing of waste rubber tires is described. Waste rubber tires are reduced in size by known methods of shredding into chip form (which can be stored in piles) for delivery to the feeding device 28. The feeding device 28 can be a lock hopper, a rotary valve or a compaction plug feeder that will prevent the outflow of the pressurized gases back through the rubber feedstock while delivering the feedstock to the eductor or entrainment device 26 through line 25. The feedstock is conveyed through reactor 10, in a carrier gas, where the pyrolysis reaction produces primary reaction products. The reaction products exiting the reactor are conducted to the filter 32 (e.g., a cyclone separator) for separation of the gases and vapors from the solids. The solids are recovered for post treatment. The gases and vapors exiting filter 32 are conducted to the condenser 34 for separation as liquids. An apparatus such as fan 35 may be disposed downstream of condenser 34 to compress gases exiting the compressor 35.

Any gases remaining after the condensation process may then be transported through lines 29 and 29a to burner 20, to both sides of heat exchanger/combustor 30, and to electrical power generator 37. Gases may alternatively (or additionally) be directed to combustor 36. Upon exiting heat exchanger/combustor 30, the gases are delivered through line 32 to line 33. Any gases exiting combustor 36 through line 31 are also delivered to line 33. Line 33 then conveys the gases to eductor 26 for mixing with feedstock and/or carrier gas.

The system may also be used in a combustion mode as further illustrated in FIG. 2. In this embodiment, hot gases exiting filter 32 through lines 27 and 27a may be delivered to a gas turbine or steam generator 39, rather than to condenser 34.

Variations in the procedure described above may also be made. For example, one or more reactor vessels 10 may be used in series. In one embodiment, the first reactor vessel can be used to dry wet feedstock while the second reactor vessel can be used for pyrolysis. In another variation, gasification of char can be performed in the first reactor vessel, followed by pyrolysis of the feedstock in the second reactor vessel with the char produced in the second reactor being recycled to the first.

A retention time of 500 milliseconds and a gas temperature of 500 degrees Celsius are adequate conditions for liquefying the rubber feedstock in the ablative transport reactor. The feedstock dimensions are preferred to be one quarter inch by one quarter inch in any two dimensions. The metals present with the waste need not be removed from the waste tires prior to being fed to the system. Rather, the metals, zinc oxide, carbon black and other solid additives can be removed following the pyrolysis reaction.

Figure 3:
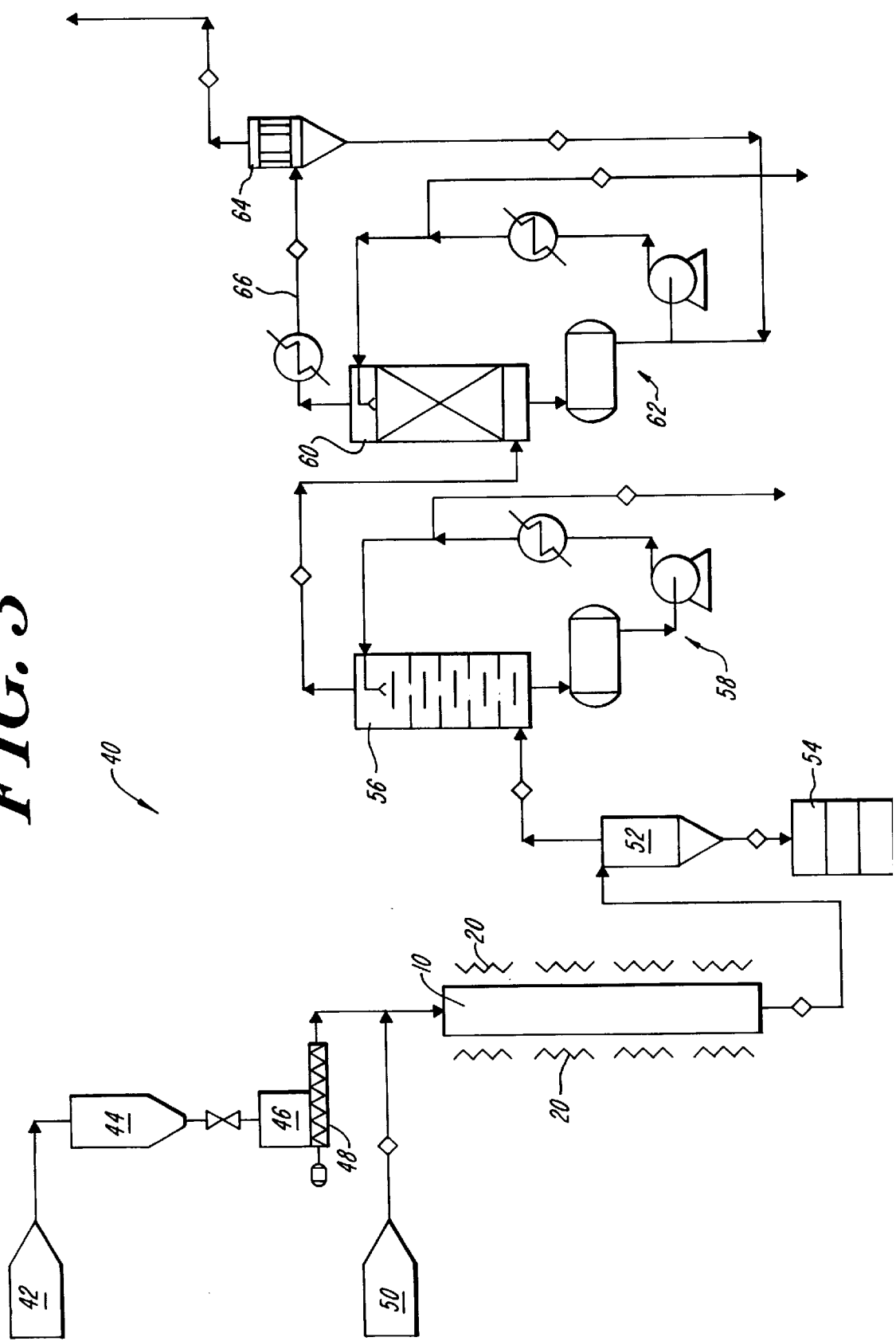
FIG. 3 shows another embodiment of a system for pyrolyzing waste rubber materials with the Ablative Transport Reactor and for recovering useful pyrolysis reaction products.

FIG. 3 illustrates an alternative system 40 for the ultra fast pyrolysis of waste products, such as rubber tires. The system comprises a feedstock (e.g., rubber) source 42 which delivers the rubber pellets to a feed bin 44 which, in turn, communicates with a feed hopper 46, such as a pressurized lock hopper. A feed mechanism 48, such as a variable speed discharge screw, conveys the rubber feedstock to reactor vessel 10. A gas source 50 provides a carrier gas, such as nitrogen, to the system to convey the feedstock through the reactor at suitable velocities. Preferably, the rubber feed rate is determined by a load cell system which supports feed hopper 46.

The feedstock is conveyed through the reactor vessel 10, as noted above, at sufficient velocities, such that centrifugal forces maintain the feedstock particles in contact with the outer periphery of the inner surfaces of the vessel. In this way an ultra fast pyrolysis reaction occurs causing the feedstock to be ablated, forming a thin film of liquid which serves as an interface between the particle and the walls of the vessel. This liquid film serves to promote lubricity and also to maintain efficient heat transfer from the vessel wall to the feedstock.

Ultimately, the feedstock particles are converted to primary pyrolysis products. Thus gas, vapor, carbon black, and certain metals exit the reactor vessel and are conveyed to a separator 52, such as a cyclone separator, which removes entrained solid particles from the gas and vapor. The carbon black and other solids are collected in a hopper 54 for subsequent analysis and/or processing.

Upon exiting separator 52, the vapors are condensed in multiple stages to derive valuable petrochemicals in liquid form. The gases and vapors are delivered to a primary condensing station 56, which may take the form of a baffle plate column. Liquids are withdrawn, collected, and transported from the primary condensing station 56 through a recovery system 58 for subsequent processing and analysis.

The gases and any remaining vapors exiting from primary condensing station 56 are delivered to a secondary condensing station 60, which preferably yields liquids condensing at a lower temperature than those recovered in the primary condensing station. Liquids recovered in station 60 are withdrawn, collected and transported through recovery system 62 for subsequent processing and analysis. Any gas exiting from station 60 may be combusted and recycled for use in heating carrier gases. Optionally, a filter 64 may be placed in the gas flow line 66 downstream of station 60 to collect any mist which may form during processing.

It is understood that the system described above preferably includes instrumentation for monitoring and controlling temperature, pressure, and flow rate. In addition, gas analysis can be provided on-line by a combination TCD/FID gas chromatograph. All instrumentation can be used in conjunction with a computerized data acquisition system which transmits essential data to a computer for instantaneous read-out and storage.

The invention is further illustrated by the following examples.

EXAMPLES

Discarded rubber tires, pelletized to a suitable size, were used as a feedstock in an ultra fast pyrolysis reaction conducted in an ablative heat transfer reactor to recover primary pyrolysis products from the rubber. The reactor vessel used was an ablative heat transfer reactor of the type described herein in which the coil diameter was 12 inches and the length of the vessel was 40 feet. The reactor was made of hollow, grade 316 stainless steel tube stock having an outside diameter of ¾ inch and a wall thickness of 0.035 inch. The reactor was operated under the following conditions:

vapor residence time: 0.41 seconds reactor pressure drop: 13.5 K Pa operating temperature: 550° C.

rubber flow rate: 2.5 Kg/hour rubber particle size: 1–3 mm

A mass balance of the pyrolysis reaction is as follows.

| Raw Material | Products | | Yield (%) |
|---|---|---|---|
| 2.454 g rubber | carbon black: | 0.821 g. | 33.5 |
| | gas: | 0.416 g. | 16.9 |
| | liquids: | 1.217 g. | 49.6 |

The carbon black produced through the pyrolysis process was very fine and appeared similar in texture to copier toner. There was no evidence of char with the carbon black.

The gas produced through the pyrolysis reaction was found to be of the following make-up:

| Compound | Percent |
|---|---|
| Hydrogen | 12.59 |
| Carbon Monoxide | 4.30 |
| Carbon Dioxide | 3.68 |
| Methane | 22.46 |
| Ethane | 2.69 |
| Ethylene | 15.15 |
| Propane | 0.88 |
| Acetylene | 0.67 |
| Propylene | 13.77 |
| iso-Butane | 0.33 |
| Unknown | 0.31 |
| n-Butane | 0.09 |
| l-Butane | 1.19 |
| iso-Butylene | 9.67 |
| trans-Butene | 1.11 |
| Propyne | 0.44 |
| cis-Butene | 0.99 |
| 1,3-Butadiene | 9.35 |
| Pentane | 0.32 |
| | 100.00 |

The liquids recovered from the gaseous phase of the reaction products were analyzed to comprise an oil of a grade similar to number 2 fuel oil as well as various petrochemicals including benzene, xylene, toluene, styrene, styrene and limonene.

Example 2

Residue from an automobile shredding process was processed in a pyrolysis reaction vessel as described in Example 1.

A mass balance of the pyrolysis reaction is as follows.

| Raw Material | Products | | Yield (%) |
|---|---|---|---|
| Auto Waste: 12.38 lb | Residue: | 9.80 lb | 83.6 |
| | Gas: | 0.38 lb | 3.3 |
| | Liquids: | 1.54 lb | 13.1 |
| | Loss: | 0.62 lb | 100.0 |

The gas was analyzed to contain the following components:

| Component | WT (%) |
|---|---|
| Acid Gas ($CO_2$/HCl) | 68.50 |
| Carbon Monoxide | 4.40 |
| Methane | 3.13 |
| Ethane | 0.81 |
| Ethylene | 2.42 |
| Propane | 0.52 |
| Propylene | 2.72 |
| Butanes | 0.10 |
| Butenes | 1.79 |
| 1,3-Butadiene | 0.35 |
| Pentanes | 0.18 |
| Pentenes | 0.16 |
| $C_6^+$ | 14.92 |
| | 100.00 |

Equivalents

Those skilled in the art will recognize, or be able to ascertain using no more than routine experimentation, numerous equivalents to the specific procedures and apparatuses described herein. Such equivalents are considered to be within the scope of this invention and are covered by the following claims.

What is claimed is:

1. A method of recovering raw material from feedstock, comprising the steps of:

providing an ultra fast pyrolysis reactor vessel comprising a hollow metallic tube having helical coils wherein the radius of the helical coils is sufficiently small to maintain the feedstock in continuous contact with heated surfaces along the outer periphery of the internal surfaces of the reactor vessel;

heating the reactor vessel by way of an external heat source;

conveying feedstock, in a granulated form, through the reactor vessel in a carrier gas at a G force, on the feedstock, in the range of 50–1000 G and at a velocity such that substantially all of the feedstock is maintained in continuous contact with heated surfaces along the outer periphery of the internal surfaces of the vessel;

pyrolizing the feedstock through heat transfer by ablative contact with said internal surfaces of the reactor vessel to yield primary pyrolysis products in the form of gases, vapors, and entrained solid products;

separating and recovering the solid products entrained with the gases and vapors; and condensing the vapors to yield recoverable liquid primary pyrolysis products.

2. The method of claim 1, wherein vapor residence time within the reactor vessel ranges from 50 to 6000 milliseconds.

3. The method of claim 1, wherein the temperature within the reactor vessel is in the range of 300° to 950° C.

4. The method of claim 1 wherein the feedstock is selected from the group consisting of waste rubber tires, waste plastics, waste papers, forest and agricultural wastes, oil shale, and tar sands.

5. The method of claim 4, wherein the size of feedstock particles does not exceed 2 inches by 2 inches in any two dimensions.

6. The method of claim 1, wherein the carrier gas is devoid of oxygen.

7. The method of claim 6 wherein the carrier gas is heated.

8. The method of claim 1, further comprising the step of recovering the liquid pyrolysis products.

9. The method of claim 1, wherein following the step of condensing the vapors, the method further comprises the steps of:

combusting remaining gases to yield a hot gas product, and mixing the hot gas product with the carrier gas.

* * * * *